(12) United States Patent
Abdel-Halim et al.

(10) Patent No.: US 11,807,793 B1
(45) Date of Patent: Nov. 7, 2023

(54) SAND FIXING AGENT

(71) Applicant: KING FAISAL UNIVERSITY, Al-Ahsa (SA)

(72) Inventors: Mohamed Gouda Abdel-Halim, Al-Ahsa (SA); Hany Mohamed Abd El-Lateef Ahmed, Al-Ahsa (SA); Mai Mustafa Khalaf Ali, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/106,628

(22) Filed: Feb. 7, 2023

(51) Int. Cl.
  *C09K 17/32* (2006.01)
  *C08F 265/10* (2006.01)
  *C09K 105/00* (2006.01)

(52) U.S. Cl.
  CPC .......... *C09K 17/32* (2013.01); *C08F 265/10* (2013.01); *C09K 2105/00* (2013.01)

(58) Field of Classification Search
  CPC .... C09K 17/32; C09K 2105/00; C08F 265/10
  See application file for complete search history.

(56) References Cited

U.S. PATENT DOCUMENTS

2021/0269717 A1* 9/2021 Na et al. ................. C09K 17/14

FOREIGN PATENT DOCUMENTS

| CN | 100355990 C | 12/2007 |
| CN | 103360168 A | 10/2013 |
| CN | 104804140 A | 7/2015 |
| CN | 105925271 A | 9/2016 |
| CN | 108192627 A | 6/2018 |
| CN | 108865150 A | 11/2018 |
| CN | 109628097 A | 4/2019 |

OTHER PUBLICATIONS

Israel et al., "Production of Cellulosic Polymers from Agricultural Wastes", Jan. 2008, E-Journal of Chemistry, vol. 5 (1), pp. 81-85. (Year: 2008).*
Jassem et al., "Cellulose Acetate Production by Acetylation of Cellulose Derived from Date Palm Fronds", 2020, Iraqi Journal of Agricultural Sciences, vol. 51(3), pp. 967-975. (Year: 2020).*
K. Khan, M.A. Aziz, M. Zubair, M.N. Amin, Biochar Produced from Saudi Agriculture Waste as a Cement Additive for Improved Mechanical and Durability Properties—SWOT Analysis and Techno-Economic Assessment, Materials. 15 (2022) 5345. https://doi.org/10.3390/ma15155345. (Year: 2022).*
Yuan et al. "Sand fixation property and erosion control through new cellulose-based curing agent on sandy slopes under rainfall," Bulletin of Engineering Geology and the Environment, Issue, Aug. 2020.
Albasheer et al., "Synthesis and Characterization of Carboxymethyl Cellulose from (Date palm) *Phoenix dactylifera* L. Leaves," SUST Repository, 2020.

* cited by examiner

*Primary Examiner* — Tara Mayo
(74) *Attorney, Agent, or Firm* — Nath, Goldberg & Meyer; Richard C. Litman

(57) ABSTRACT

A sand fixing agent derived from palm tree frond comprises poly-(acrylamide) grafted carboxymethyl cellulose and a carbon alkanal.

14 Claims, 2 Drawing Sheets

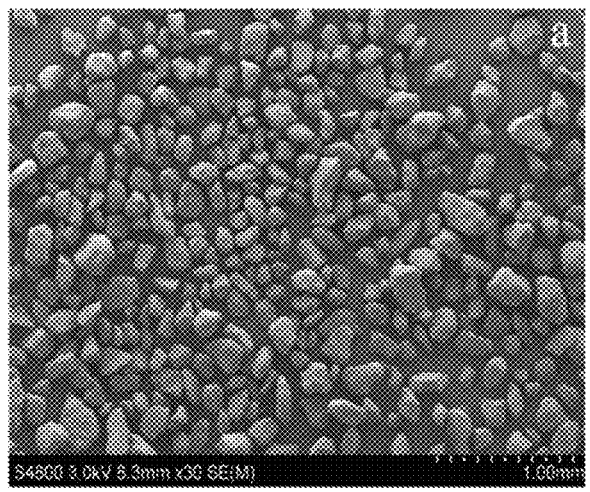 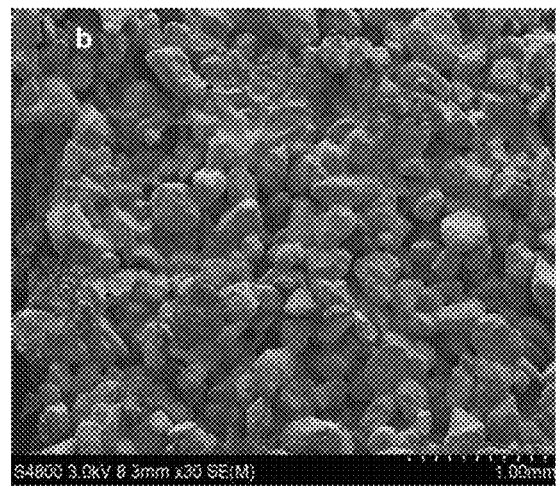
FIG. 1A                                      FIG. 1B
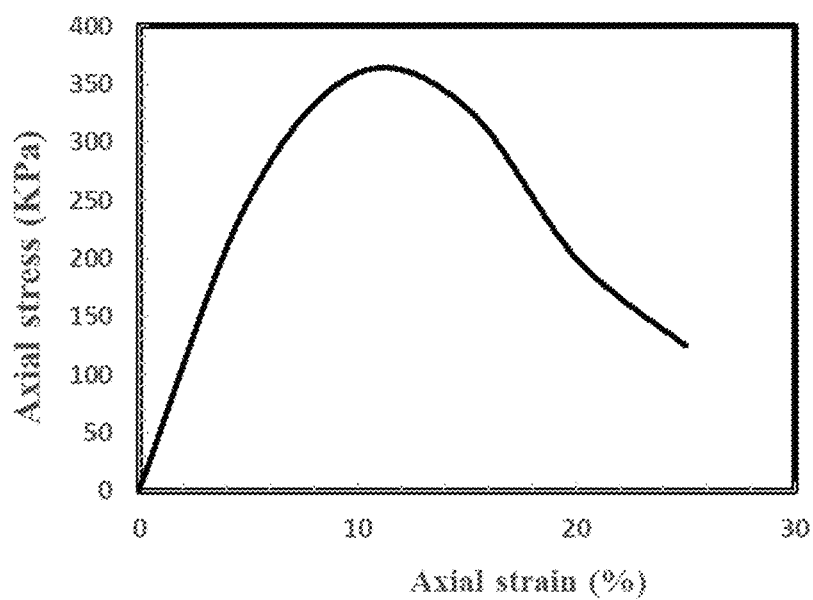
FIG. 2

SAND FIXING AGENT

BACKGROUND

1. Field

The disclosure of the present patent application relates to an agent for controlling desertification and, particularly, to a sand fixing agent derived from palm tree frond.

2. Description of the Related Art

Deserts all over the world are expanding rapidly due to the increasing frequency of sandstorms. Desertification degrades air quality, diminishes biodiversity, and jeopardizes the earth's natural balance. Due to a reduction in accessible land resources, desertification affects agricultural productivity. Desertification also harms water conservation and transportation infrastructure, diminishing human life quality and impeding social growth. In dry and semiarid locations, sand erosion by wind is the most common cause of desertification, but additional natural and/or unnatural processes include runoff erosion, infrequent rainfall and drought, plant destruction, and soil salinization, among others. The problem of sand movement as a result of wind may sometimes lead to serious disasters, causing damage to the country's economies, including, by way of non-limiting example, damage to highways, impact on railways, erosion of sand in irrigation canals, and diseases caused by breathing sand-laden air.

Prior efforts to prevent and control desertification have involved the use of a mechanical sand barrier. While a mechanical sand barrier can effectively block wind to allow sand fixation, it can be inconvenient and costly to transport a mechanical sand barrier. In addition, the mechanical sand barrier does not have significant ecological and economic benefits, which is not conducive to long-term stable ecological restoration and ecological planning.

Desert bio-mulching has also been used to control desertification. Desert bio-mulching includes planting a desert shrub plant in a strip pattern. As the shrubs require regular irrigation and protection, desert bio-mulching is typically associated with high investment of manpower and cost. Moreover, the desert shrubs have slow growth, a low survival rate, and cannot address immediate needs of wind prevention and sand fixation.

Accordingly, a sand fixation agent solving the aforementioned problems is desired.

SUMMARY

The present subject matter relates to a sand fixing agent including poly-(acrylamide) grafted carboxymethyl cellulose and a carbon alkanal. In one embodiment, the carboxymethyl cellulose is extracted from waste date palm fronds. The sand mixing agent can be mixed with sand to give stability to sandy areas, e.g., deserts, to prevent or minimize movement of the sand by wind or rainfall.

In an embodiment, a method of preparing a sand fixing agent can include obtaining a cellulose extract from an agricultural product, modifying the cellulose extract by carboxymethylation to provide a carboxymethyl cellulose extract, grafting the carboxymethyl cellulose extract with polyacrylamide to provide a copolymer, and treating the copolymer with a carbon alkanal to provide the sand fixing agent. In an embodiment, the agricultural product is waste palm tree frond.

In a further embodiment, the present subject matter relates to a method of increasing the cohesion of sand, comprising: contacting the sand with a solution of the sand fixing agent as described herein in water; and obtaining treated sand having increased cohesion between individual sand particles.

These and other features of the present invention will become readily apparent upon further review of the following specification.

BRIEF DESCRIPTION OF THE DRAWINGS

FIG. 1A is a scanning electron microscope (SEM) image of a sand sample before treatment with the sand fixing agent.

FIG. 1B is an SEM image of the sand sample mixed with a solution including a 10% concentration of the sand fixing agent.

FIG. 2 is a graph showing results of a compression test conducted on a sand sample treated with a solution including a 10% concentration of CMC-E-g-PAm-N.

Similar reference characters denote corresponding features consistently throughout the attached drawings.

DETAILED DESCRIPTION OF THE PREFERRED EMBODIMENTS

Figure 3:
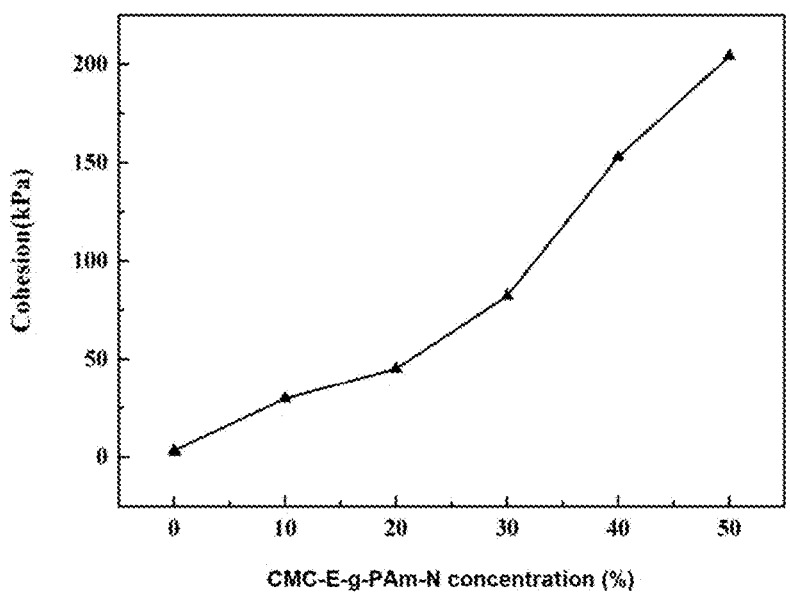
FIG. 3 is a graph showing shear strength parameters that were determined in terms of internal friction angles and cohesiveness.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

In one embodiment, the present subject matter relates to a sand fixing agent including poly-(acrylamide) grafted carboxymethyl cellulose and a carbon alkanal. The sand fixing agent can be mixed with sand to stabilize sand and increase the hydrophobic properties of sand. The sand fixing agent can help to maintain the cohesion of sand grains and, thereby, minimize or prevent movement of sand grains by wind and rainfall.

In an embodiment, the sand fixing agent can be prepared by obtaining a cellulose extract from agricultural waste using any suitable method known in the art. In an embodiment, the cellulose extract is obtained from waste palm tree frond. The cellulose extract is modified by carboxymethylation to provide a carboxymethyl cellulose extract (CMC-E). The carboxymethyl cellulose extract is grafted and copolymerized with polyacrylamide and then treated with a high carbon alkanal, e.g., nonanaldehyde, to enhance the hydrophobicity features of the grafted product. Modification of the cellulose extract by the carboxymethyl group and the amide group forms a Schiff base with the nonanaldehyde.

In an embodiment, the carboxymethyl cellulose extract (CMC-E) can be prepared by reacting the cellulose extract with monochloroacetic acid in the presence of an alkaline medium. Then, CMC-E can be grafted with the acrylamide in the presence of ceric ammonium nitrate as an initiator.

In another embodiment, treatment of sand with the present sand fixing agent can stabilize the sand against adhesion forces between individual sand grains. In addition, the present sand fixing agent can increase any hydrophobic properties of the sand, thereby assisting in maintaining cohesion between individual sand grains. As a result, such treated sand will have increased stability and will be more resistant to wind and rainfall than untreated sand.

In certain embodiments, sand to be treated is mixed with a specified concentration of the sand fixing agent (CMC-E-g-PAm-N). For example, the sand to be treated can be mixed with a solution containing about 10% to about 50% of the sand fixing agent, or about 10%, about 15%, about 20%, about 25%, about 30%, about 35%, about 40%, about 45%, or about 50% of the sand fixing agent, by weight. Said solutions comprise the sand fixing agent in water. Once the sand is treated, the sand fixing agent can connect the sand particles to one another to create a stable structure. In an embodiment, the sand fixing agent can strengthen the bonds between the sand particles and interlocks the sand particles, thereby lowering the sand's void ratio.

In further embodiments, the cohesion of treated sand samples will rise as the concentration of the sand fixing agent solution rises. In other embodiments, increases in sand density of the treated sand will lead to further increases in the cohesion of the treated sand as well.

The present teachings are illustrated by the following examples.

EXAMPLE 1

Grafting Carboxymethylcellulose Extract (CMC-E) with Acrylamide

CMC-E was grafted with acrylamide in the presence of ceric ammonium nitrate as an initiator as follows: 2.0 g of CMC-E was added to 100 mL of deionized water and stirred well using an ultrasonic bath for 24 hours. Ceric ammonium nitrate was added to the solution as an initiator and maintained for 15 minutes at 60° C. to form an active site product (CMC-E-I). Polyacrylamide (PAm) was added to the CMC-E-I with stirring. Grafting reaction time was allowed to progress for 2.0 h at 60° C. and the reaction was terminated by the addition of quinone. The non-grafted homopolymer was removed with acetone. The grafted CMC-E-g-PAm was dried using a vacuum. The sand fixing agent was obtained by dissolving 0.5 g of CMC-E-g-PAm in 100 mL water with continuous stirring for 8 hours at 30° C. to form a solution and nonanaldehyde was then added to the solution in the presence of sodium hydroxide. The product (CMC-E-g-PAm-N) was transferred into a rotary with a vacuum to eliminate the unreacted aldehyde.

EXAMPLE 2

Sand Specimen Preparation

A dry sand sample was mixed with different concentrations of the sand fixing agent (10 wt % –50 wt % in distilled water) by hand stirring to obtain a uniform sand mixture. The sand and sand-fixing agent mixture was dried in an oven at 50° C. for 24 hours. The dried samples were transferred to determine the compression and shear tests and characterized using SEM.

Surface morphology of the sand alone and in combination with the sand fixing agent was investigated. FIG. 1A is an SEM image of the sand sample before treatment with the sand fixing agent. FIG. 1B is an SEM image of the sand sample mixed with a 10% concentration of the sand fixing agent (CMC-E-g-PAm-N). The CMC-E-g-PAm-N wraps and connects the sand particles to create a stable structure, as seen in FIG. 1B. The CMC-E-g-PAm-N likely strengthens the bonds between the sand particles and interlocks the sand particles, thereby lowering the sand's void ratio. It was demonstrated that two crucial elements for creating a stable structure are the dry density of the sand sample and the concentration of the fixing agent in the solution that is combined with the sand sample.

EXAMPLE 3

Compression Test

FIG. 2 shows results of a compression test conducted on a sand sample treated with 10% of CMC-E-g-PAm-N. Axial strain caused the axial stress to build until the axial stress reached a peak value. After reaching the peak value, the axial stress progressively decreased to a value that was more stable. Peak strength and residual strength are defined, respectively, as the maximum strength value and the strength value that is generally steady. FIG. 2 illustrates the peak strength of the sand specimen treated with 10% of CMC-E-g-PAm-N. The maximum axial strain obtained was 370 KPa.

EXAMPLE 4

Shear Test

Various concentrations of CMC-E-g-PAm-N were tested to determine the effect of concentration on the cohesion force of treated sand specimens. FIG. 3 shows the shear strength parameters that were determined in terms of internal friction angles and cohesiveness. As seen in FIG. 3, the cohesion of treated sand samples rise as CMC-E-g-PAm-N concentrations rise. For example, the cohesion values for samples with CMC-E-g-PAm-N concentrations of 10%, 20%, 30%, 40%, and 50% were 30, 45, 82, 153, and 204 kPa, respectively. Additionally, when the sand density grew, the cohesion of each CMC-E-g-PAm-N concentration specimen increased as well.

It is to be understood that the sand fixing agent is not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A sand fixing agent, comprising poly-(acrylamide) grafted carboxymethyl cellulose and nonanaldehyde.

2. A method of preparing the sand fixing agent as recited in claim 1, comprising:
   obtaining a cellulose extract from an agricultural product;
   modifying the cellulose extract by carboxymethylation to provide a carboxymethyl cellulose extract;
   grafting the carboxymethyl cellulose extract with polyacrylamide to provide a copolymer; and
   treating the copolymer with a nonanaldehyde to provide the sand fixing agent.

3. The method as recited in claim 2, wherein the agricultural product is an agricultural waste product.

4. The method as recited in claim 3, wherein the agricultural waste product is waste palm tree frond.

5. The method as recited in claim 2, wherein the carboxymethyl cellulose extract is prepared by reacting the cellulose extract with monochloroacetic acid in the presence of an alkaline medium.

6. The method as recited in claim 2, wherein the carboxymethyl cellulose extract is grafted with polyacrylamide in the presence of ceric ammonium nitrate.

7. A method of increasing the cohesion of sand, comprising:
   contacting the sand with a solution of the sand fixing agent of claim 1 in water; and
   obtaining treated sand having increased cohesion between individual sand particles.

8. The method of claim 7, wherein the solution has a concentration of the sand fixing agent of about 10% to about 50%, by weight.

9. The method of claim 7, wherein the treated sand is more resistant to rain and wind than untreated sand.

10. A method of preparing a sand fixing agent, comprising:
    obtaining a cellulose extract from an agricultural product;
    modifying the cellulose extract by carboxymethylation to provide a carboxymethyl cellulose extract;
    grafting the carboxymethyl cellulose extract with polyacrylamide to provide a copolymer; and
    treating the copolymer with a nonanaldehyde to provide the sand fixing agent.

11. The method as recited in claim 10, wherein the agricultural product is an agricultural waste product.

12. The method as recited in claim 11, wherein the agricultural waste product is waste palm tree frond.

13. The method as recited in claim 10, wherein the carboxymethyl cellulose extract is prepared by reacting the cellulose extract with monochloroacetic acid in the presence of an alkaline medium.

14. The method as recited in claim 10, wherein the carboxymethyl cellulose extract is grafted with polyacrylamide in the presence of ceric ammonium nitrate.

* * * * *